United States Patent [19]

Chang et al.

[11] Patent Number: 5,754,367
[45] Date of Patent: May 19, 1998

[54] AIR BEARING SLIDER HAVING ETCHED AND SHAPED LEADING EDGE TAPER

[75] Inventors: Ciuter Chang, Fremont; Pablo Gabriel Levi, San Jose, both of Calif.

[73] Assignee: Read-Rite Corporation, Milpitas, Calif.

[21] Appl. No.: 858,804

[22] Filed: May 19, 1997

[51] Int. Cl.$^6$ ............................................. G11B 5/60
[52] U.S. Cl. ............................................................ 360/103
[58] Field of Search ................................. 360/102–104, 360/125, 126

[56] References Cited

U.S. PATENT DOCUMENTS

| | | | |
|---|---|---|---|
| 4,996,614 | 2/1991 | Okutsu | 360/103 |
| 5,287,235 | 2/1994 | Cunningham et al. | 360/103 |
| 5,343,343 | 8/1994 | Chapin | 360/103 |
| 5,359,480 | 10/1994 | Nepela et al. | 360/103 |
| 5,396,386 | 3/1995 | Bolasna et al. | 360/103 |
| 5,508,862 | 4/1996 | Lazzari et al. | 360/103 |
| 5,654,853 | 8/1997 | Hagen | 360/106 |
| 5,677,812 | 10/1997 | Cha | 360/103 |

FOREIGN PATENT DOCUMENTS

| | | | |
|---|---|---|---|
| 55-105858 | 8/1980 | Japan | 360/103 |
| 60-47278 | 3/1985 | Japan | 360/103 |
| 62-9574 | 1/1987 | Japan | 360/103 |
| 06-223525 | 8/1994 | Japan | . |
| 07-111054 | 4/1995 | Japan | . |
| 09-115258 | 5/1997 | Japan | . |

*Primary Examiner*—Jefferson Evans
*Attorney, Agent, or Firm*—Nathan N. Kallman

[57] ABSTRACT

The air bearing surface (ABS) of an air bearing slider is formed with etched pads and a leading edge shaped shallow etch step taper region that extends continuously between first and second sides of the slider. A first pad is formed on the slider and extends from the trailing edge between the first side and a central axis and has a first extension at the step taper region. The first extension has a leading edge that is angled toward the first side of the slider. A second pad is formed on the slider and extends from the trailing edge between the second side and the central axis and has a second extension at the step taper region. The second extension has a leading edge that is angled inwardly toward the central axis. The first pad and the second pad provide an air bearing surface (ABS) for the slider. A deep central recess is bounded by the first pad, the second pad, and the step taper region. The design realizes constant flying attitudes, fast takeoff, less sensitivity to disk velocity and skew angle, and less sensitivity to altitude variation.

13 Claims, 1 Drawing Sheet ize form factor slider configuration that uses the shaped etched taper to gain design flexibility and improves the manufacturing tolerance control.

AIR BEARING SLIDER HAVING ETCHED AND SHAPED LEADING EDGE TAPER

FIELD OF THE INVENTION

This invention relates to air bearing sliders for use in magnetic head assemblies and in particular to the air bearing surface geometry of a slider having a leading edge shaped shallow etch step taper.

BACKGROUND OF THE INVENTION

Magnetic recording heads used in disk drives typically incorporate air bearing sliders carrying magnetic transducers that fly over the surface of a magnetic disk for reading and writing data on the disk. The slider is supported by a gimbal assembly that is connected to a head arm. The head arm positions the slider over individual data tracks of the disk. As the disk rotates it generates an air flow parallel to the tangential velocity of the disk. The air flow provides a lift that allows the slider to fly above the disk. When used with very narrow transducing gaps and very thin magnetic record films, a close spacing between the transducer and the disk surface allows short wavelength, high frequency signals to be recorded, thereby affording high density, high storage capacity recording. During operation of the disk drive, it is desirable to maintain a substantially constant flying height and a tightly controlled pitch of the slider relative to the disk surface.

Air bearing surfaces of presently known air bearing sliders incorporate tapered portions at the leading edge and pads or rails following the tapered portions. The contours of the air bearing surfaces determine the pressurization which in turn results in a particular flying attitude of the air bearing slider. The leading edge tapered portion area of the slider provides the initial pressure build-up and affects the pressure distribution of the rest of the air bearing slider surface that follows the tapered portion. Hence the leading edge tapered portion of the slider plays an extremely important role in determining the flying attitudes of the air bearing slider.

Problems that exist with known air bearing sliders having leading edge tapered portions are twofold, i.e., a lack of flexibility in shaping the taper and the difficulty in achieving a tight process tolerance control of the lapped taper length and taper angle. The former limits the design optimization of the air bearing slider while the latter, a lack of process control, results in a wide distribution of flying attitude.

A major thrust in disk drive design is toward smaller compact drives with smaller components. As a result, head suspensions and head sliders are being reduced in size. It is desirable to make a shortened slider body without sacrificing constant flying height from inner diameter (ID) to outer diameter (OD) of the disk.

As slider dimensions become smaller, the tapered portions are shortened proportionally. Typically the taper length is in the range of 10 to 15 percent of slider length. This further increase the difficulty of manufacturing the lapped taper.

SUMMARY OF THE INVENTION

An object of this invention is to provide an air bearing for a reduced size form factor slider configuration that uses the shaped etched taper to gain design flexibility and improves the manufacturing tolerance control.

Another object of this invention is to provide an air bearing slider wherein by properly arranging the shape and depth of a taper, a constant pitch is achieved.

Another object is to provide an air bearing slider having an air bearing surface geometry that results in the takeoff velocity of the slider being significantly reduced which improves contact-start-stop (CSS) performance.

According to this invention, an air bearing slider is formed with a leading edge and a trailing edge and having a central longitudinal axis extending from the leading edge to the trailing edge and first and second sides substantially parallel to the axis and perpendicular to the edges. The slider comprises a step taper located at the leading edge of the slider, the step taper extending between the first and second sides, and extending back toward the trailing edge to a defined length and preferred shape.

A first pad is formed on the slider that extends from the trailing edge between the first side and the central axis. The first pad has a portion that is configured as a first extension into the step taper area. The first extension has opposing sides that are angled outwardly toward the slider first side.

A second pad is formed on the slider that extends from the trailing edge between the second side and the central axis. The second pad has a portion that is configured as a second extension into the step taper area. The second extension has a side that is angled inwardly toward the central axis and a side that is angled towards the slider first side. The step taper has a defined depth with reference to the ABS.

In accordance with an aspect of the invention, a major central recess is provided that is bounded by the first pad, the second pad and the step taper. The recess has a defined depth with reference to the ABS that is a multiple of the step taper depth.

In a specific embodiment of the invention, the step taper depth is about 20 micro-inches and the recess depth is approximately 120 micro-inches.

The first and second pads near the leading edge area incorporated with the step taper are shaped in such a way that they are angled toward the direction where air flow velocity is lowest, typically at the inner diameter of the disk, to enhance the pressurization; and angled away from the direction where the air flow velocity is highest, typically at the outer diameter of the disk, to decrease the pressurization. The advantages to shaping the step taper and pads this way are twofold. First, due to the enhancement of the pressurization of the taper portions at the inner diameter of the disk, the takeoff velocity of the air bearing slider is significantly improved. Second, the lessened pressurization of the taper portions at the outer diameter helps to reduce the pitch angle which leads to constant pitch angle and results in a constant minimum flying height design.

The invention has the advantage that the pattern of the slider of the present invention, with shaped etch step taper and shaped rail, provides constant flying attitudes i.e. constant flying height, constant pitch and constant roll.

The invention has the further advantage that the design flexibility has been significantly enhanced.

The invention also has the advantage that the design using shaped etch step taper eliminates the process tolerance control of a mechanically lapped step taper.

Still another advantage is that the takeoff velocity is significantly reduced which improves the CSS performance.

Another advantage is that as a result of the constant pitch, minimum flying height deviations are significantly reduced.

DESCRIPTION OF THE DRAWINGS

The invention will be described in greater detail with reference to the drawings in which.

DESCRIPTION OF THE INVENTION

Figure 1:
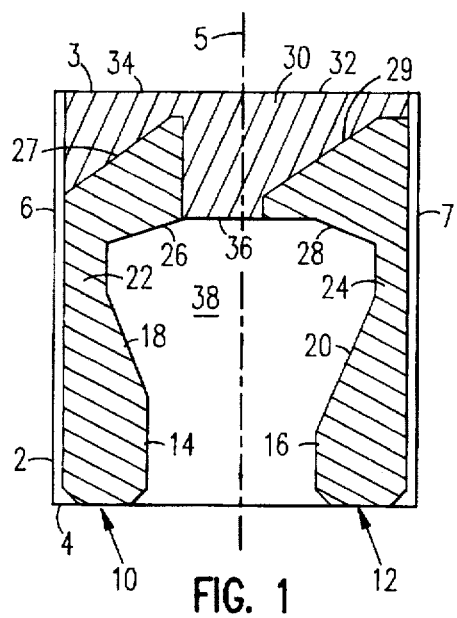
FIG. 1 is plan view of the air bearing surface (ABS) of an air bearing slider, according to this invention.
Figure 2:
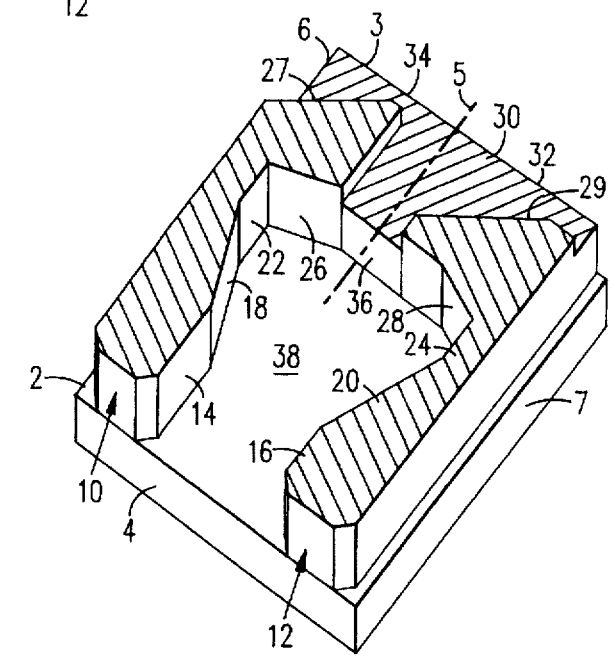
FIG. 2 is a perspective view of the air bearing surface (ABS) of FIG. 1.

With reference to FIG. 1 and FIG. 2, an air bearing slider 2 is defined by a leading edge 3 and a trailing edge 4, a central longitudinal axis 5 extending from the leading edge to the trailing edge, and first and second sides 6, 7 substantially parallel to the central axis and perpendicular to the edges 3 and 4. The slider 2 is formed with a step taper 30 located at the leading edge of the slider. The step taper extends continuously between the first and second sides of the slider.

The air bearing surface of the head slider 2 is formed with rails or pads 10 and 12. A cavity or recess 38 between the pads 10, 12 is formed preferably by etching.

The first pad 10 extends from the trailing edge 4 between the first side 6 and the central axis 5 and has a polygon-type extension 26 adjacent to the taper region. The extension 26 has a leading edge 27 that is angled toward the first side 6.

The second pad 12 extends from the trailing edge 4 between the second side 7 and the central axis 5 and has a polygon-type extension 28 in the step taper region. The extension 28 has a leading edge 29 that is angled inwardly toward the central axis 5. The first and second pads 10, 12 provide an air bearing surface (ABS). The step taper has a depth between 10–30 micro-inches approximately, preferably about 20 micro-inches with reference to the ABS in this embodiment.

A deep central recess 38 is provided that is bounded by the first pad 10, the second pad 12, and the trailing edge 36 of the step taper 30. In accordance with this invention, the size and depth of the recess 38 is optimized to achieve proper amount of subambient pressure for a desired flying performance. The recess 38 is etched to a depth with reference to the ABS that is a multiple of the step taper depth. The depth of the central recess is between 80–200 micro-inches approximately, preferably about 120 micro-inches with reference to the ABS in this embodiment.

Not shown in the drawing is a transducer which typically is located at the trailing end where pads 10, 12 coincide with the trailing edge 4 of the slider.

As the pad configuration progresses towards the trailing end of the slider, each respective pad 10, 12 has a narrow waist portion 22, 24 following the polygon-type extensions 26, 28. Following the narrow waist portions 22, 24 respectively, trapezoidal portions 18, 20 are formed. Rectangular portions 14, 16 having angled corners are disposed between the trapezoidal portions 18, 20 and the slider trailing end 4. The pads define the recess 38 and the trailing edge 36 of the step taper.

The recess 38 provides a negative pressure area between the pads to oppose the lift force applied to the pads. Lift force is provided at the pads at the sides of the slider, while an opposing load force caused by the recess 38 is centralized at the recess.

Method of Manufacture

The method of manufacturing a surface of a magnetic head slider in accordance with the present invention employs known masking and etching techniques. The method comprises the steps of etching a step taper 30 at the leading edge of the slider to a depth of, for example, 20 micro-inches with reference to the air bearing surface of the slider 2. The step taper extends continuously between the first side 6 and the second side 7 and extends toward the trailing end 4 to a defined length. The etch mask area is such that an extension 26 of the first pad 10 is formed at the step taper region between the first side 6 and the central axis 5. The extension 26 has a leading edge side 27 that is angled toward the first side 6 of the slider. Similarly, the etch mask area is such that an extension 28 of the second pad 12 is formed at the step taper region between the second side 7 and the central axis 5. The extension 28 has a leading edge side 29 that is angled inwardly toward the central axis 5. A recess 38 is then etched to a depth with reference to the air bearing surface that is a multiple of the step taper depth, for example, 120 micro-inches. The recess is bounded by the first pad 10, the second pad 12, and the step taper 30.

In a preferred embodiment of the invention, each of the first and second pads 10, 12 respectively has a waist portion 22, 24 which increases the size of the recess 38.

TABLE 1 below lists the results of numerical modeling of the air bearing slider made in accordance with this invention. Values of flying height (FH) at transducer location, as well as minimum flying height of the slider in units of micro-inches, are listed for a typical 3.5 inch disk drive operated at 7200 revolutions per minute (RPM). Also listed in TABLE 1 are pitch angle and roll angle in units of micro-radians.

TABLE 1

| Radius (inch) | Skew (deg) | FHgap ($\mu$") | FHmin ($\mu$") | Pitch ($\mu$Rad) | Roll ($\mu$Rad) |
|---|---|---|---|---|---|
| 0.84 | −10.55 | 1.68 | 1.34 | 245.5 | 7.28 |
| 1.22 | 2.46 | 1.77 | 1.40 | 261.0 | 9.16 |
| 1.78 | 16.44 | 1.78 | 1.42 | 254.6 | 8.83 |

TABLE 1 demonstrates that the air bearing slider design made in accordance with the present invention provides a narrow range of variations in flying height, pitch angle and roll angle over a wide range of radius and skew angle of a disk drive.

Figure 3:
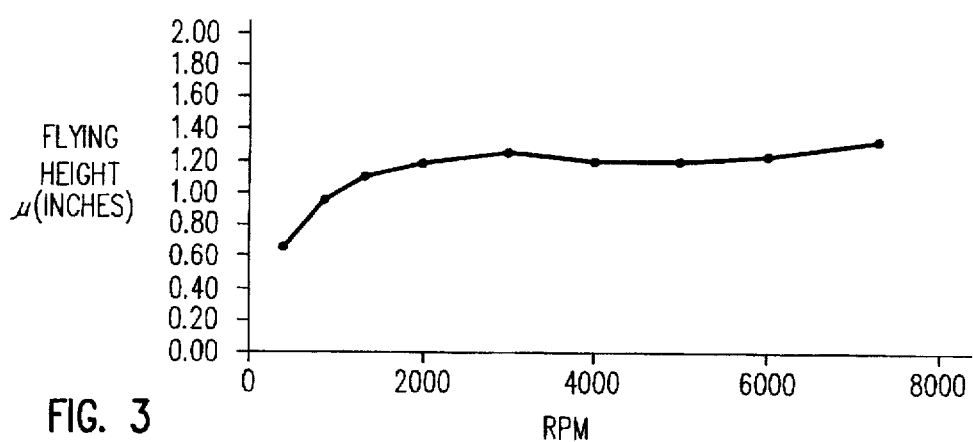
FIG. 3 is a plot of flying height of the slider of FIG. 1 versus disk speed in revolutions per minute (rpm).

FIG. 3 shows the minimum flying height FHmin in micro inches as a function of disk rotational speed in progressing from start to an operational speed of 7200 RPM. The slider quickly achieves a minimum flying height of 1.20 micro-inches at 2000 RPM, maintains approximately that flying height through 6000 RPM, and then increases its flying height slightly as it approaches and reaches the operational speed of 7200 RPM. This attribute of fast takeoff of the slider is highly desirable in current disk drives for improved contact-start-stop (CSS) performance.

What is claimed is:

1. A magnetic head slider having a leading edge and a trailing edge and having a central longitudinal axis extending from said leading edge to said trailing edge and first and second sides substantially parallel to said axis and perpendicular to said edges, comprising:

a step taper region located at said leading edge of said slider;

said step taper region extending continuously between said first and second sides of said slider and toward said trailing edge to a defined length;

a first pad formed on said slider extending from said trailing edge between said first side and said central axis and having a first portion extending to said step taper region;

said first extending portion having a leading edge side that is angled toward said first side; and a second pad formed on said slider extending from said trailing edge between said second side and said central axis and forming a second portion extending to said step taper region;

said second extending portion having a leading edge that is angled inwardly toward said central axis;

said first and second pads defining an air bearing surface;

said step taper region having a depth referenced to said air bearing surface.

2. The magnetic head slider of claim 1 wherein said step taper region has a depth approximately in the range of 10 to 30 micro-inches.

3. The magnetic head slider of claim 1 including a central recess bounded by said first pad, said second pad, and said step taper region, said central recess having a depth referenced to said air bearing surface that is a multiple of said step taper region depth.

4. The magnetic head slider of claim 3 wherein said central recess depth is in the range of 80 to 200 micro-inches approximately.

5. The magnetic head slider of claim 3 wherein each of said first and second pads has a waist portion that narrows a portion of said first and second pads and thus increases the size of said central recess.

6. The magnetic head slider of claim 5 wherein each of said extending portions is shaped in a polygon-type design, and said waist portion of each of said pads are adjacent to said extending portions, each of said pads including a rectangular portion having angled corners adjacent to said trailing edge of said slider, and a trapezoidal portion between said waist portion and said rectangular portion.

7. A disk drive apparatus having a rotatable magnetic disk for coaction with a magnetic transducer, wherein rotation of said disk causes an air flow having a defined velocity, comprising:

an air bearing slider for supporting said transducer, said slider having a leading edge and a trailing edge and having a central longitudinal axis extending from said leading edge to said trailing edge and first and second sides substantially parallel to said axis and perpendicular to said edges;

a step taper region located at said leading edge of said slider, said step taper region extending continuously between said first and second sides of said slider and toward said trailing edge to a defined length;

a first pad formed on said slider extending from said trailing edge between said first side and said central axis and having a first portion extending to said step taper region;

said first extending portion having a leading edge side that is angled toward said first side; and a second pad formed on said slider extending from said trailing edge between said second side and said central axis and forming a second portion extending to said step taper region;

said second extending portion having a leading edge that is angled inwardly toward said central axis;

said first and second pads defining an air bearing surface;

said step taper region having a depth referenced to said air bearing surface.

8. A disk drive apparatus as in claim 7, wherein said leading edges of said extending portions are angled toward the direction where said air flow is lowest and away from the direction where air flow is highest, so that said slider has fast takeoff, and the pitch angle of said slider is substantially constant thereby affording a constant minimum flying height.

9. A disk drive as in claim 8, wherein said magnetic disk has a diameter of about 3.5 inches and said disk is rotated at about 7,200 revolutions per minute and said minimum flying height is about 1.20 micro-inches.

10. A method of manufacturing a magnetic head slider with an airbearing surface, said slider having a leading edge, a trailing edge, a central longitudinal axis extending from said leading edge to said trailing edge and first and second sides substantially parallel to said axis and perpendicular to said edges comprising the steps of:

forming first and second pads on said air bearing surface by etching a step taper region to a depth referenced to said air bearing surface at said leading edge of said slider, said step taper region extending continuously between said first and second sides and extending toward said trailing edge to a defined length, such that a first extension of said first pad is defined at said step taper region between said first side and said central axis, said first extension having a leading edge that is angled toward said first side; and such that a second extension of a second pad is defined at said step taper region between said second side and said central axis, said second extension having a leading edge that is angled inwardly toward said central axis; and etching a central recess to a depth that is referenced to said air bearing surface that is a multiple of said step taper region depth, such that said first pad including said first extension is defined extending from said trailing edge between said first side and said central axis on said slider; and such that said second pad including said second extension is defined extending from said trailing edge between said second side and said central axis, said central recess being bounded by said first pad rail, said second pad rail, and said step taper region.

11. The method of claim 10 wherein said step taper region depth is in the range of 10–30 micro-inches approximately.

12. The method of claim 10 wherein said central recess is etched to a depth in the range of 80–200 micro-inches approximately.

13. The method of claim 10 wherein each of said first and second pads has a waist portion that narrows a portion of said pads and thus increases the area of said central recess.

* * * * *